UNITED STATES PATENT OFFICE.

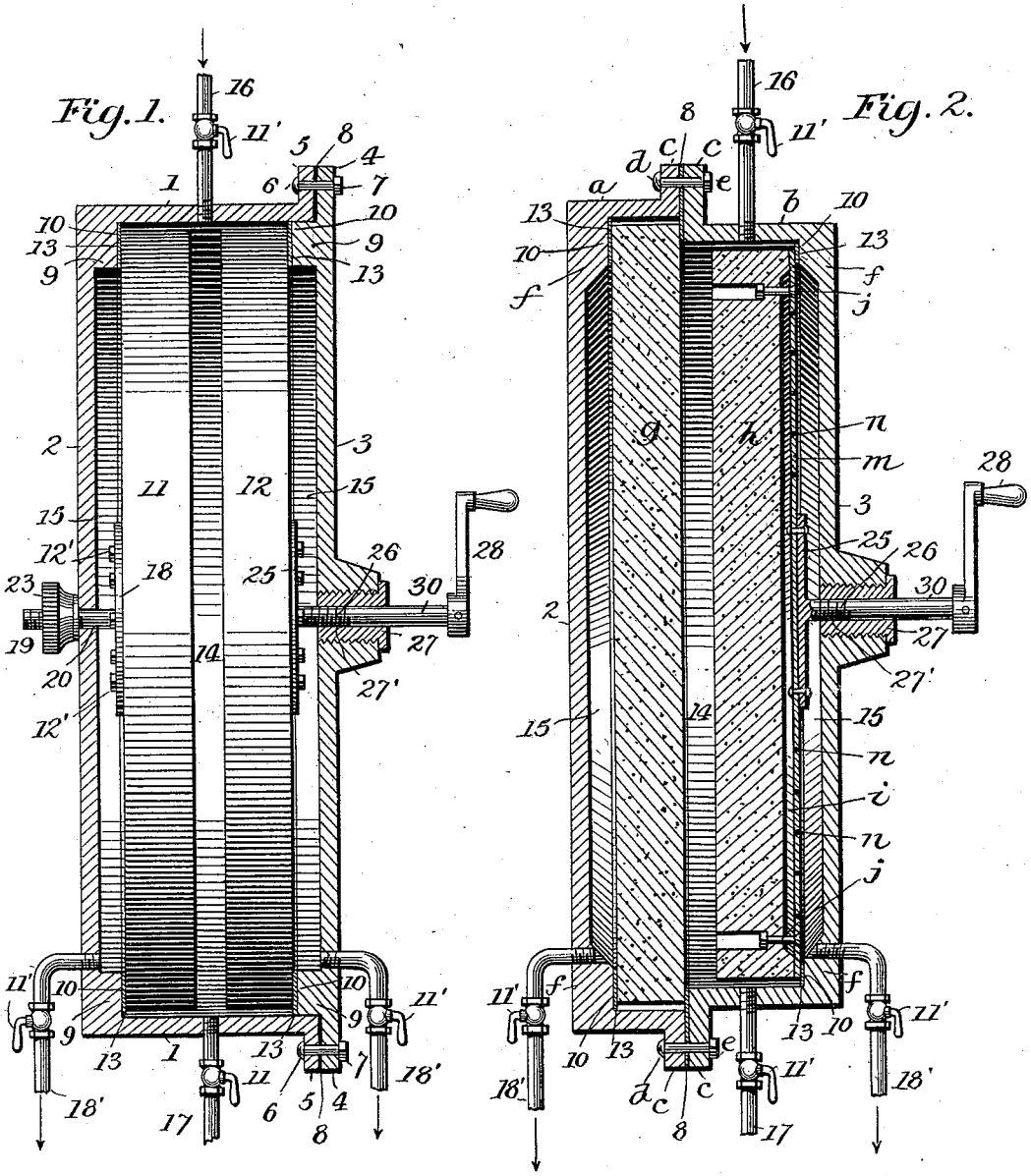

ZEPH FENNO, OF WASHINGTON, DISTRICT OF COLUMBIA.

WATER-FILTER.

SPECIFICATION forming part of Letters Patent No. 557,370, dated March 31, 1896.

Application filed September 14, 1895. Serial No. 562,476. (No model.)

*To all whom it may concern:*

Be it known that I, ZEPH FENNO, a citizen of the United States, residing at Washington, in the District of Columbia, have invented certain new and useful Improvements in Water-Filters; and I do hereby declare the following to be a full, clear, and exact description of the invention, such as will enable others skilled in the art to which it appertains to make and use the same.

This invention relates to new and useful improvements in water-filters; and it consists substantially in such features of construction, arrangement, and combinations of parts as will hereinafter be more particularly described.

The invention has reference more particularly to that class of water-filters in which the filtering medium is constituted of porous walls or bodies; and the object of the invention is the provision of means for readily and effectively cleansing or removing from the surfaces of the walls or bodies all deposits or accumulations of slime and sediment and to render the operation of the filter much more reliable and rapid.

A further object of the invention is to greatly reduce the labor attendant upon the use of the filter, as well as to simplify the construction and to cheapen the cost of manufacture.

These objects I attain by the means illustrated in the accompanying drawings, wherein—

Figure 1 is a central vertical sectional view, in part elevation, of a water-filter constructed and arranged in accordance with my invention; and Fig. 2 is a central vertical sectional elevation illustrating a modified form.

In carrying my invention into effect I may resort to a great many different embodiments; but preferably I employ either one of the constructions substantially as I have herein represented in the accompanying drawings. Thus in Fig. 1 the numeral 1 designates the outer casing or shell of the filter, which is circular in form and which at one end is closed by a head 2 and at the other end by a head 3, which is removable for the purpose of enabling access to be had to the filter whenever desired. That end of the casing which is closed by the removable head 3 is formed or provided with an annular flange 4, and the said removable head is correspondingly flanged at 5, and the head is secured in place by means of bolts 6 passing through the two flanges and tightened up by means of nuts 7. In this way the shell or casing is rendered perfectly water-tight; but, if desired, a packing 8 may be interposed between the two flanges as an additional security. The said heads 2 and 3 are each formed with an inwardly-extending annular flange 9, which flanges constitute seats or bearings 10 for the porous bodies or walls 11 and 12, through the medium of which the filtration or purification of the water is effected. These said bodies or walls are also preferably circular in form, and they are so arranged or disposed within the shell or casing as to abut at their outer sides near the edges against the annular seating-flanges 9 9 of the heads 2 and 3, respectively, of the said shell or casing. They are also arranged or disposed relatively apart, and each of the seating flanges or bearings is provided with a packing-ring 13 of any suitable material, so as to make the joints between the said flanges and walls perfectly water-tight. In this way a chamber 14 is obtained between the walls or bodies for unfiltered water, while between the outer surface of each wall and its adjacent casing-head a chamber 15 is formed, into which the filtered water passes. The said chamber 14 is provided at the top with an inlet-pipe 16 for unfiltered water, as well as an outlet-pipe 17 at the bottom for carrying off the accumulations of sediment and other foreign matter when cleaning, the chambers 15 being each provided with an outlet 18' for drawing off the pure or filtered water as occasion may require, it being understood, of course, that each one of the several pipes referred to is provided with a suitable shut-off cock or valve 11'. With this particular embodiment of my invention it is preferable, as a safeguard against any of the unfiltered water becoming mixed with the filtered water, to provide means for enabling the porous bodies or walls 11 and 12 to be drawn up tightly against their seats on the bearing-flanges, and while any suitable tightening devices may be employed I have found such as I have herein represented to fully answer the purpose. Thus in Fig. 1 I attach or secure to the outer surface of the body or wall 11, centrally thereof, by means of bolts 12', a disk or plate 18, from which projects a screw 19, that extends through an opening 20 formed centrally of the head 2 of the casing, and working on this screw is a milled nut 23, which is conveniently grasped and turned whenever it is desired to tighten up the said porous body or wall. The opening 20 is of smooth bore, and, if desired, a small leather washer may be placed on the screw between the head 2 and the nut in order to prevent any water leaking through said opening. The other porous body or wall 12 is also provided in a similar manner on its outer side with a plate or disk 25, and from this plate a screw-shaft 26 extends and passes through and engages for a part of its length with a bushing 27 secured or fitted in the head 3, also at the center thereof, and screw-threaded interiorly for a part of its length at 27'. It will thus be seen that by turning the nut 23 the said body or wall 11 will be tightened on its seat, and that by turning the screw-shaft 26 to the left, by means of its crank or handle 28, the said body or wall 12 will also be tightened up.

I propose as a means of cleansing or removing all accumulating sedimentary deposits from the inner surfaces of the porous walls to move or carry one of said walls into contact with the other, and then to rotate the one against the other, so as to grind off or wear away the surface of each until fresh or clean surfaces are presented by which to enable the filtering operation to be continued. Any suitable devices may be resorted to for this purpose; but as a convenient means I form the screw-shaft 26 of the wall or body 12 with an extended portion 30 having a smooth surface corresponding to the smooth part of the bushing, and then when the said screw-shaft is turned to the right until its threaded portion has passed inwardly beyond the inner end of the threaded portion of the bushing 27 the smooth extended portion 30 thereof will still rest in and be supported by the bushing, and the shaft may then be turned or rotated so as to cause the inner surface of the body or wall 12 to grind against the corresponding surface of the opposite body or wall 11. In a very short time the filtering-surfaces can in this way be worn down sufficiently to loosen from the surfaces all deposits of sand, dirt, and other foreign substances, and these are instantly carried off by causing a stream of water to flow through the central chamber from the inlet to the outlet pipes. The screw-shaft 26 is only threaded a sufficient distance from its inner end to act as a feed for moving the body or wall 12, both when the latter is carried to the body or wall 11 and when it is brought back against its seat or bearing-flange, and it will be understood that while rotating the said body or wall 12 it is only necessary to exert a slight force inwardly upon the shaft to maintain sufficient friction to effect the desired grinding action between the two bodies. The said bodies may consist of porous stone or some suitable porous plastic composition, and I desire it to be understood that I attach considerable importance to the manner in which I effect the cleaning thereof. In addition to one body serving as a cleaner for the other I also utilize both bodies to filter with, and it will at once be seen what important advantages are derived from the construction and arrangement generally.

It is apparent that various modifications could be made or resorted to in practice, and as one example I refer to Fig. 2. In this figure it will be seen that I form the casing or shell in two parts $a$ and $b$, each annularly flanged at $c$ and joined together by bolts $d$ and nuts $e$, the said part $a$ being of a little greater internal diameter than the part $b$, and each part having an internal seat or flange $f$ for one of the porous walls or bodies $g$ $h$. In this instance the body or wall $g$ (which corresponds to the body or wall 11 in Fig. 1) is held tightly against its seat by means of the flange $c$ of the part $b$ of the casing, and thus I am enabled to dispense with any tightening devices for this particular wall or body. In this modification also the outer surface of the body or wall $h$ is sunken slightly at $i$ to form a shallow chamber, and attached or secured to said outer surface by bolts $j$ at near the circumference of the body is a plate or disk $m$ of the same size as the body, and which plate or disk is formed throughout with a number of holes or perforations $n$, so as to permit the water filtered through such body to pass into or enter the outer chamber at the side. In all other respects, including the chambers for the filtered water and the means for moving the body $h$ into contact with the body $g$ and then turning the same, the construction is substantially the same in Fig. 2 as in Fig. 1.

From the foregoing description my invention will be thoroughly understood, it is thought, and without limiting myself to the precise details of construction and arrangement shown and described.

I claim—

1. A water-filter comprising two porous filtering-bodies arranged relatively apart, and means for carrying one of said bodies into contact with the other and for rotating the one against the other, substantially as shown and for the purpose described.

2. A water-filter comprising two porous filtering-bodies, an intermediate chamber for unfiltered water, a chamber on the outer side of each body for filtered water, and means for carrying one of said bodies into contact with the other and for rotating the one against the other, substantially as described.

3. A water-filter comprising two porous filtering-bodies arranged relatively apart, annular bearing-seats for the bodies, and means for carrying one of said bodies into contact with the other and for rotating the one against the other, substantially as described.

4. A water-filter comprising two porous filtering-bodies having packed annular bearings or seats, an intermediate chamber for unfiltered water, a chamber on the outer side of each body for filtered water, and means for carrying one of said bodies into contact with the other and for rotating the one against the other, substantially as described.

5. A water-filter comprising two porous filtering-bodies arranged relatively apart and having annular seats, means for carrying one of said bodies into contact with the other, and for rotating the one against the other, and means for tightening said bodies against their seats, substantially as described.

6. A water-filter comprising a casing or shell, two porous filtering-bodies arranged relatively apart and having annular bearings or seats, an outer chamber for each body, a screw and nut for tightening one body in place and a screw-shaft for tightening up the other body, the said shaft being threaded for a part of its length from the inner end only, and the remaining portion thereof being of smooth surface, and a partially-threaded bushing in which said shaft works, substantially as described.

7. A water-filter comprising an outer shell or casing constructed in two parts and flanged and united together, corresponding internal annular flanges or seats, a porous filtering-body resting against one of said flanges, a similar body resting against the other flange and sunken or recessed in its outer side, a perforated plate secured to the outer side of this second body, a central partially-screw-threaded bushing in the side of the shell, and a screw-shaft passing through said bushing and united to the perforated plate, said shaft being of smooth surface for a part of its length, substantially as shown and for the purpose described.

8. A water-filter comprising an outer casing, two porous filtering-bodies arranged relatively apart, a central partially-screw-threaded bushing in one side of the casing, and a shaft working in said bushing and fastened to one of the porous bodies, the said shaft being threaded for a part of its length adjacent to the body and provided with an operating crank or handle, substantially as described.

In testimony whereof I affix my signature in presence of two witnesses.

ZEPH FENNO.

Witnesses:
E. EVERETT ELLIS,
K. KANOUSE.